United States Patent Office 3,249,617
Patented May 3, 1966

3,249,617
N-ALKYLATED D-LYSERGIC ACID
Albert Hofmann and Franz Troxler, Bottmingen, Basel-Land, Switzerland, assignors to Sandoz Ltd. (also known as Sandoz A.G.), Basel, Switzerland
No Drawing. Filed Sept. 4, 1964, Ser. No. 394,592
Claims priority, application Switzerland, Aug. 19, 1960, 9,397/60; Oct. 26, 1960, 11,974/60; Jan. 27, 1961, 967/61; Feb. 16, 1961, 1,891/61
5 Claims. (Cl. 260—285.5)

The present application is a continuation-in-part of application Serial No. 131,487, filed August 15, 1961, now abandoned, and is restricted to certain optically active D-lysergic acid derivatives substituted with $R_1$ in the 1-position, $R_1$ being limited to alkyl of 1 to 3 carbon atoms inclusive and alkenyl of 3 to 4 carbon atoms inclusive.

The new optically active D-lysergic acid derivatives above-identified have unique utility as intermediate compounds to produce valuable optically active pharmaceuticals, e.g. optically active hydroxy amides of lysergic acid, such as 1-methyl-D-lysergic acid (+)-butanolamide-(2').

It is noted that these optically active hydroxy amides, especially the butanolamides, have been discovered to possess outstanding utility in the field of mental drugs and the utility which has been recognized for these final products is as antagonists to serotonin, which is described in the following literature:

Sicuteri, F.: Int. Arch. Allergy 15, 300 (1959).
Sicuteri, F., Michelacci, S., Franchi, G.: Int. Arch. Allergy 15, 291 (1959).
Sandoz Laboratories, Basel, Switzerland, Scientific Exhibit. Fed. of Amer. Soc. Exp. Biol., Chicago, Illinois, April 1960.
Scherbel, A. L.: Harrison, J. W.: Clin. Res. Proc. 6, 402 (1958).

As seen in assignee's Patent No. 3,084,164 dated April 2, 1963, entitled "Lysergic Acid Halide Hydrohalides" in the name of Albert Frey, the 1-methyl-D-lysergic acid (+)-butanolamide-(2') can be produced from 1-methyl-D-lysergic acid chloride hydrochloride. One method is as follows: 0.5 g. of 1-methyl-D-lysergic acid chloride hydrochloride (the chloride hydrochloride is made as shown in this patent from the free acid) is suspended in a 30 cc. mixture of 3 parts of absolute chloroform and 1 part of tertiary butanol, cooled to 0–10° and then 1 g. of (+)-2-aminobutanol is added. After 10 minutes 50 cc. of a 10% solution of tartaric acid are added to the clear brown solution and after washing with diethyl ether the solution is made alkaline with 2 N solution of ammonia. The separated base is extracted with chloroform and the chloroform extract is concentrated in a partial vacuum after drying over potash. The evaporation residue is dissolved in methanol and a molar amount of maleic acid is added. The pure 1-methyl-D-lysergic acid (+)-butanolamide-(2')-maleate has a melting point of 183°, $[\alpha]_D^{20} = +42°$ (c.=0.4 in water).

Another efficient synthesis of 1-methyl-D-lysergic acid (+)-butanolamide-(2') from 1-methyl-D-lysergic acid is the conversion of the free acid into its anhydride with sulfuric acid and condensation of that anhydride with (+)-2-aminobutanol.

In both cases above it is an optically active 1-alkyl-D-lysergic acid which represents a unique intermediate possessing optical activity which is utilized to produce a final product having therapeutic activity and optical activity and the unexpected process advantage lies in the absence of side reactions, in the absence of difficulties of isolation and purification, and in the remarkable high yield of high purity, optically active final product. The optically active intermediates of the present invention are superior in a number of ways and these can best be exemplified by a consideration of the only two practical routes of obtaining the desired 1-alkylated D-lysergic acid hydroxy amides.

The first method proceeds via the intermediates D-lysergic acid hydroxy amides (unsubstituted in the 1-position) which are alkylated in the 1-position, i.e. at the indole nitrogen atom. In the first stage, the conversion of the D-lysergic acid to its hydroxy amide, the yield is approximately 60 to 70%.

In the second stage, i.e. the alkylation, because a hydroxyl group is present, no excess of the alkylating agent may be used because, in accordance with the "Williamson's Ether Synthesis," this hydroxyl group of the hydroxy amide side chain would also be alkylated.

However, when no excess of the alkylating medium is utilized, the alkylation of the D-lysergic acid amide is not complete, so that, as a result, the desired alkylated compound is obtained in admixture with the unalkylated compound and with various other impurities. It is not thereafter possible to purify the desired compound which contains from about 5 to about 20% of impurities, by mere recrystallization. Instead, a tedious, time-consuming, technically expensive and difficult chromatography must be effected. As regards the yield, this is in the order of 60%. Thus, the total yield for this process, suggested through analogy to the prior art of British Patent No. 811,964 of April 15, 1959, is approximately 36%.

The other process for the production of the desired 1-alkylated D-lysergic acid hydroxy amides is the process employing the intermediate of the present invention and proceeds via the starting D-lysergic acid, first through the alkylation stage and then through the amidification step, e.g., reaction of the reactive derivatives of the alkylated acid to produce the dextro-rotatory optical isomer of the butanolamide final product or adjacent homolog thereof. These two stages of the process for the production of the desired end product are founded upon one key intermediate, e.g., the intermediate of the invention, which is itself optically active; and the selection of the present intermediate uniquely makes the action proceed more easily, more rapidly, more uniformly and, in every way, more economically and more efficiently.

Thus, the alkylation of the D-lysergic acid surprisingly proceeds completely uniformly, with no occurrence of isomerization or esterification (esterification usually occurs when an alkali metal salt of a carboxylic acid is reacted with an alkyl halide), and a 90% yield results.

Similarly, the conversion to the amide proceeds very easily, a 70% yield resulting and the end product containing less than 1% of impurities. In strong contrast to the impurities resulting in the first process, these impurities can be very easily removed by simple recrystallization whereupon the desired pure product results.

The total yield is thus approximately twice that obtained according to the first process. Aside from the enormous advantage gained by obtaining a higher yield, the time factor, which plays a tremendous part in the present highly competitive chemical industry, is greatly in favour of the process of the invention since the purification time alone is about five times longer when chromatographic methods must be utilized instead of simple recrystallization. Naturally, the cost of the purification is also considerably less in the case of recrystallization than in the case of chromatography.

In summarizing, it may be said that not only is the yield of the first process of the prior art analogy method considerably less than the yield of the process of the invention, but the percentage of impurities occurring in each stage of the first process cannot be removed by simple recrystallization.

It is noted that analogous alkylations of an indole carboxylic acid primarily result in the acid ester which is unalkylated in the 1-position, the literature reference showing this being the Journal of the Chemical Soc. Transactions (London) XCIX II (1911) on page 2069 that when treating tryptophan with methyl iodide and sodium hydroxide according to England's method the indole nitrogen atom remains unaffected while the carboxylic group is esterified.

It has also been stated in Karrer, 7th edition (1941), Organic Chemistry, Elsevier, Amsterdam, p. 220 "A further oft employed method for producing esters from carboxylic acids is based upon the reaction between carboxylic acid salts and alkylating agents."

From the foregoing, it was not to be expected that D-lysergic acid could be alkylated in the 1-position without the carboxyl radical being affected in accordance with the method claims of the present invention.

The present new compounds, used as intermediates, correspond to the Formula I,

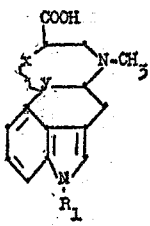

(I)

wherein $R_1$ represents alkyl of 1 to 3 carbon atoms inclusive or alkenyl of 3 to 4 carbon atoms inclusive and $\overbrace{x\ y}$ represents the

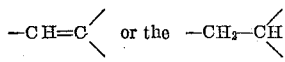

grouping.

The present D-lysergic acid derivatives of Formula I are prepared by treating a D-lysergic acid of Formula II:

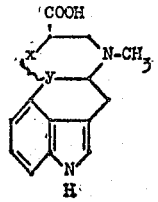

(II)

wherein $\overbrace{x\ y}$ has the above significance, with an alkali metal amide in liquid ammonia and the resulting alkali metal salt is reacted with an organic halogen compound of the formula:

$$R_1\text{—Hal}$$

wherein $R_1$ has the above significance, and Hal signifies a member selected from the group consisting of chlorine, a bromine atom, an iodine atom, and, when the salt is desired, the addition salt being made by treating with an organic or inorganic acid.

The preferred method is:

An alkali metal, preferably sodium, is oxidized with ferric nitrate in liquid ammonia to form the alkali metal amide, e.g. sodium amide. The dry acid II is added and after a few minutes the resulting alkali metal salt is mixed with the desired organic halogen compound $R_1$—Hal. 2 to 10, preferably 3 to 5 atoms of alkali metal and 2 to 10 mols, preferably 4 to 6 mols of the organic halogen compound are used per mol of acid.

The ammonia may be evaporated a few minutes after addition of the organic halogen compound. To isolate the compound I the reaction mixture is shaken between water and ether and the aqueous phase filtered through a talc layer. The procedure which is then followed depends on the acid and the organic halogen compound used. The isolation of 1-methyl-D-lysergic acid in pure, crystalline form is particularly simple, it being sufficient for the aqueous solution to be brought to a pH value of 4.5 to 5 with acetic acid. Otherwise, the aqueous solution may be evaporated to dryness and methanol poured over the dry residue, the inorganic salts and the small quantity of 1-methyl-isolysergic acid present going into solution and the 1-methyl-D-lysergic acid remaining undissolved.

It is surprising that the above process gives good results when free D-lysergic acid or 9,10-dihydro-D-lysergic acid is used as a starting material, as side reactions (e.g. esterification or isomerization) were to be expected. Furthermore, it was to be expected that the reaction product would be difficult to isolate in the pure state.

It is surprising that the present preferred process can be applied to such complicated optically active molecules as the above compounds II and that good yields result.

At room temperature the compounds I are solid, easily crystallizable substances. They are very slightly soluble in water and practically insoluble in non-polar solvents. In polar solvents, e.g. alcohol, they are fairly to difficultly soluble. They are ampholytes and hence readily soluble in alkalis and inorganic acids. With Keller's color reagent and Van Urk's color reagent they give a characteristic color reaction.

In the following examples, all temperatures are given in degrees centigrade. The melting points are uncorrected.

*Example 1.—1-methyl-D-lysergic acid*

A solution of 1.2 g. of sodium in 200 cc. of liquid ammonia is oxidized with ferric nitrate to sodium amide, 4.7 g. of D-lysergic acid are added and the brown solution mixed with a solution of 10 g. of methyl iodide in 10 cc. of ether after 5 minutes. After a further 5 minutes the ammonia is evaporated in the absence of moisture, finally in a vacuum, and the dry residue shaken between 250 cc. of ether and 400 cc. of water. The aqueous phase is filtered through a talc layer, evaporated to dryness, the dry residue warmed slightly together with 100 cc. of methanol and the undissolved 1-methyl-D-lysergic acid filtered off. For the purpose of removing dark impurities and small quantities of D-lysergic acid, the mixture is dissolved in methanolic alkali, filtered through a talc layer and the mixture brought to a pH value of 6 by adding acetic acid dropwise, the 1-methyl-D-lysergic acid crystallizing as an almost colorless crystalline powder. Melting point: 237 to 239°, $[\alpha]_D^{20} = +120°$ (c.=0.5 in 0.1 N aqueous methane sulphonic acid). Only in 1500 to 2000 parts of pyridine does the compound dissolve. Keller's color reaction: blue.

*Example 2.—1-allyl-D-lysergic acid*

A solution of 1.4 g. of sodium in 200 cc. of liquid ammonia is oxidized with ferric nitrate to sodium amide and 5.0 g. of D-lysergic acid are added to the decolorized solution. After 5 minutes a mixture of 10 g. of allyl bromide and 20 cc. of ether is added to the solution. After a further 5 minutes the ammonia is evaporated and the residue absorbed in about 100 cc. of water. The solution is then filtered from the ferric hydroxide, the filtrate brought to a pH value of 4 to 6 by adding acetic acid, the solution decanted from the separated oily 1-allyl-D-lysergic acid and the compound recrystallized from methanol. Melting point: 209 to 211°, $[\alpha]_D^{20} = +120°$ (c.=0.5 in 0.1 N methane sulphonic acid). Keller's color reaction: grey-blue.

*Example 3.—1-ethyl-D-lysergic acid*

In a manner analogous to that described in Example 2, the 1-ethyl-D-lysergic acid results from 5 g. of D-lysergic acid, 1.4 g. of sodium and 12 g. of ethyl iodide in 200 cc. of liquid ammonia. Prisms from methanol. Melting point 219 to 220°, $[\alpha]_D^{20} = +113°$ (c.=0.5 in 0.1 N methane sulphonic acid). Keller's color reaction: blue.

Example 4.—1-n-propyl-D-lysergic acid

In an analogous manner to that described in Example 2, 1-n-propyl-D-lysergic acid results from 10 g. of D-lysergic acid, 2.8 g. of sodium and 28.5 g. of n-propyl iodide in 400 cc. of liquid ammonia. Melting point 206 to 208°, $[\alpha]_D^{20}=+102°$ (c.=0.5 in 0.1 N methane sulphonic acid). Keller's color reaction: blue.

Having thus disclosed the invention, what is claimed is:
1. Optically active D-lysergic acid compounds of the formula:

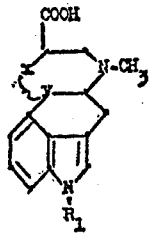

wherein $R_1$ is a member of the group consisting of an alkyl of 1 to 3 carbon atoms inclusive and an alkenyl of 3 to 4 carbon atoms inclusive and $\widehat{x\ y}$ is a member selected from the group consisting of

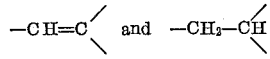

2. 1-methyl-D-lysergic acid.
3. 1-allyl-D-lysergic acid.
4. 1-ethyl-D-lysergic acid.
5. 1-n-propyl-D-lysergic acid.

References Cited by the Examiner
UNITED STATES PATENTS
3,084,164   4/1963   Frey _____ 260—285.5
FOREIGN PATENTS
811,964   4/1959   Great Britain.

NICHOLAS S. RIZZO, *Primary Examiner.*